May 17, 1960

O. L. RILEY 2,936,658

TWIST DRILL

Filed Aug. 8, 1956

INVENTOR.
OSCAR L. RILEY
BY
*J. Warren Kinney Jr.*
ATTORNEY

May 17, 1960 O. L. RILEY 2,936,658
TWIST DRILL
Filed Aug. 8, 1956 2 Sheets-Sheet 2
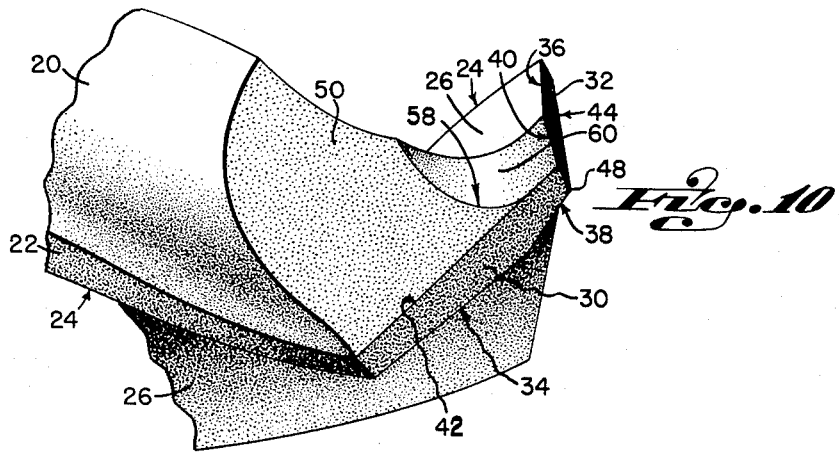
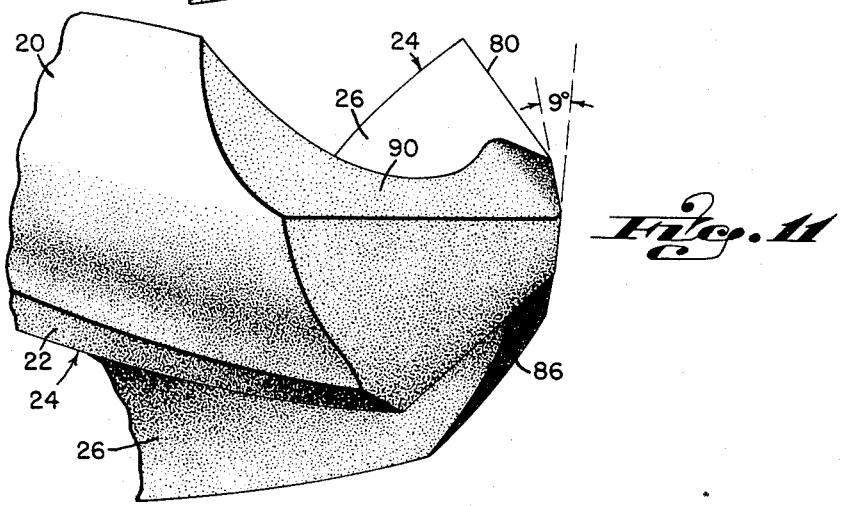
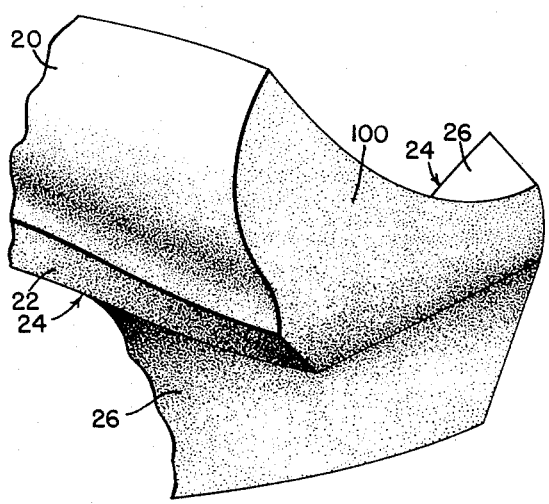
INVENTOR.
OSCAR L. RILEY
BY
ATTORNEY United States Patent Office 2,936,658
Patented May 17, 1960

2,936,658
TWIST DRILL
Oscar L. Riley, Mattoon, Ill.
Application August 8, 1956, Serial No. 602,742
8 Claims. (Cl. 77—70)

This invention relates to twist drills, and more particularly to twist drills of the type having two spiral cutting blades for drilling metal.

An object of the invention is to provide a twist drill with an integral cutting tip which results in greater cutting efficiency and longer drill life between sharpenings, than heretofore obtainable with presently available twist drills.

For ease of understanding of my contribution to the art and the manner in which my twist drill differs from the present day, commercially available twist drills, I shall make repeated reference to the structural details of the two types of twist drills commercially available today, to wit, the Cleveland twist drills and the so-called conventional twist drills.

Another object of the invention is to provide improved twist drills ranging in sizes from one-quarter inch to three inches in diameter, provided with cutting tips which require less power to drive, develop less heat during use and retain a sharp cutting edge for prolonged periods of time, effecting overall productivity increases ranging from 500% to 3000% over the presently commercially available twist drills.

A further object of the invention is to provide a twist drill having tip cutting edges that are so constructed and arranged as to eliminate the need of pre-drilling the work for providing a pilot hole, as has heretofore been the common practice.

Still a further object of the invention is to provide a twist drill having the hereinabove described characteristics, which may be initially used to start and complete holes up to three inches in diameter in general mild steel and hard metals, thereby eliminating the need for using a series of drills each of a progressively larger diameter.

Another object of the invention is to provide a twist drill with integral means for effectively directing coolant to the cutting edges without requiring the use of special coolant-supplying equipment.

Still a further object of the invention is to provide a twist drill having the hereinabove described characteristics and which includes a cutting tip defined by a pair of diametrically opposed cutting edges each having both primary and secondary clearances arranged to materially reduce the drag on the drill and increase its efficiency.

Another object of the invention is to provide a twist drill having a pair of diametrically opposed cutting edges each having a primary clearance of a width approximating the width of the cutting edge of the spiral cutter blades of the drill.

These and other objects are attained by the means described herein and as disclosed in the accompanying drawings, in which.

Figure 1:
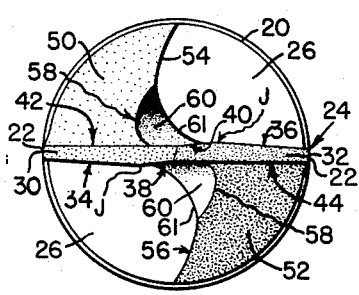
Fig. 1 is a plan view of the cutting end of a twist drill embodying the teachings of the present invention.
Figure 2:
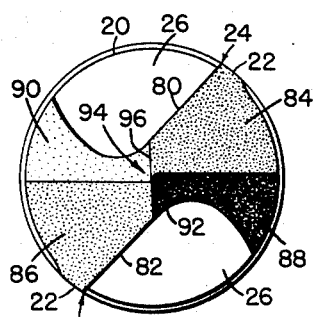
Figs. 2 and 3 are plan views of the cutting ends of a Cleveland twist drill and a so-called conventional twist drill, respectively.
Figure 3:
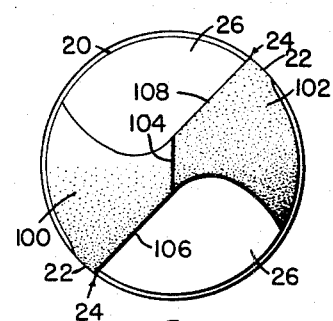
Figure 4:
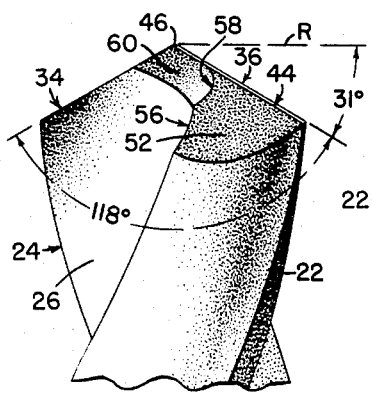
Figs. 4, 5 and 6 are views in elevation of the drills of Figs. 1, 2 and 3, respectively.
Figure 5:
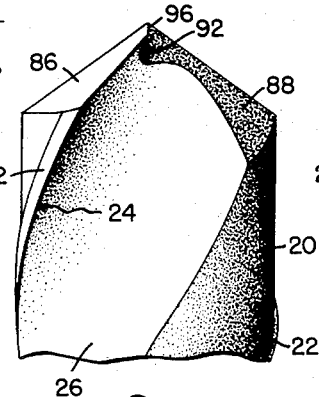
Figure 6:
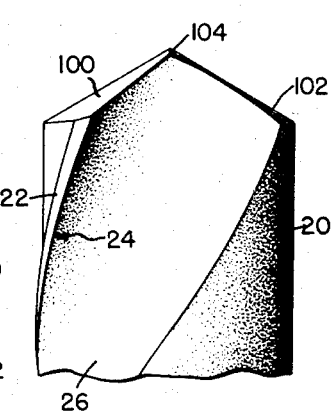
Figure 7:
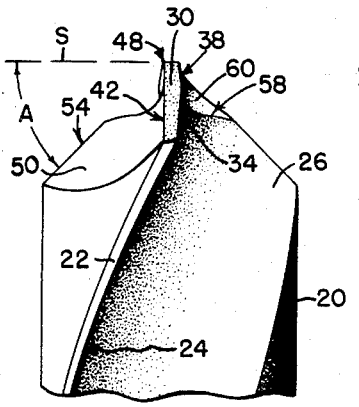
Figure 8:
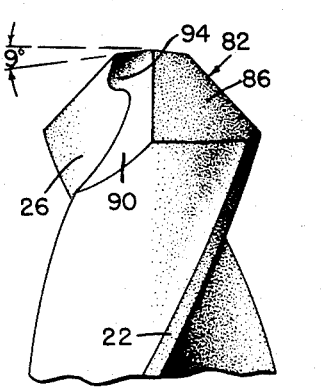
Figure 9:
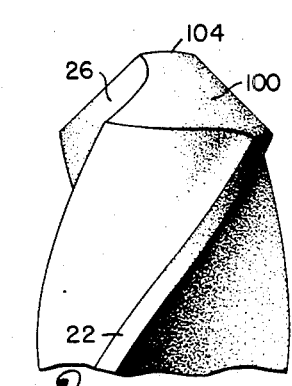

Figs. 7, 8 and 9 are views in elevation of the drills of Figs. 1, 2 and 3, respectively, but rotated 90° with respect to the position of those drills in Figs. 4, 5 and 6.

Fig. 10 is a fragmentary view in perspective of the cutting end of a twist drill embodying the teachings of the present invention.

Fig. 11 is a fragmentary view in perspective of the cutting end of a Cleveland twist drill.

Fig. 12 is a fragmentary view in perspective of the cutting end of a so-called conventional twist drill.

With reference to the Figures 1 through 12, it will be noted that the prior art drills as well as the twist drill of the present invention comprise a twisted body portion 20 having spiral cutting blades 22 which project radially beyond the body portion and which terminate in a chisel edge 24. The numerals 26 denote spiral flutes through which coolant is fed to the tip of the drills and through which the chips are ejected.

With particular reference now to Figs. 1, 4, 7 and 10, it will be noted that the cutting tip of the subject drill differs materially from the cutting tips of the drill of Figs. 2, 5, 8 and 11 and the drill of Figs. 3, 6, 9 and 12.

In the subject drill of Figs. 1, 4, 7 and 10, the cutting end or tip includes and is defined by a pair of diametrically opposed relatively narrow, elongate lips or blades 30 and 32 having main, outer, leading cutting edges 34 and 36; main, inner, leading cutting edges 38 and 40; and rear or trailing edges 42 and 44, respectively.

The elongate lips or blades 30 and 32 comprise what will hereinafter be referred to as primary clearances, each of which tapers downwardly at an angle of from 2½° to 8° from their leading to their trailing edges, respectively, that is, the rear or trailing edges 42 and 44 are from 2½° to 8° lower than their respective inner and outer leading edges 38, 34 and 40, 36.

The elongate lips or blades 30 and 32 intersect at 46 in a narrow apex having an elevated corner or sharpened point 48, see Fig. 7. The outer leading edges 34 and 36 are disposed on opposite sides of a median line passing through the center of the drill tip, while the inner leading edges 38 and 40 are also parallel and inclined towards the center for forming the relatively sharp point 48.

Those surfaces denoted by the numerals 50 and 52 between trailing edges 42 and 44 and fluted edges 54 and 56, respectively, constitute the secondary clearances of the drill, and in the preferred embodiment of the invention these secondary clearances include surfaces inclined from 20° to 45° from a line S normal to the axis of the drill, as indicated by the angle A, Fig. 7.

In the subject drill the upper ends of each of the flutes 26 are ground away as at 58 to provide cavities 60 whose lower ends 61 are in free, open, unobstructed communication and relationship with flutes 26 and whose upper periphery extends into the secondary clearances 50 and 52 and along the central portion of the trailing edge of one of the primary clearances and along the adjacent inner leading edge of the other of the primary clearances, thereby exposing an appreciable area on opposite sides of the central portion of the primary clearances which is in open communication with flutes 26. In this manner I have provided simple yet highly effective means for introducing coolant, via flutes 26 and cavities 60 to the very tip of the drill and closely adjacent the cutting edges thereof.

As best illustrated in Fig. 4, the included angle between cutting edges 34 and 36 approximates 118°, wherein each of said cutting edges is inclined 31° from a line R through tip 46 and normal to the axis of the drill.

As best illustrated in Figs. 1 and 7, the width of elongate lips or blades 30 and 32 is relatively narrow, said width at the periphery of the drill approximating the overall width of the spiral cutting blades 22, each of which terminates in a chisel edge 24. The width of each of said blades 30—32 gradually increases from a minimum dimension at the outer periphery of the drill body to a maximum dimension at J, where the outer and inner leading cutting edges 34—38 and 36—40 intersect. In the preferred embodiment of the invention the width of the blades decreases slightly from points J to apex 46, it being noted that the trailing edges 42 and 44 are substantially parallel with each other and with a median through the center axis of the drill.

With particular reference now to Fig. 1, it will be seen that cavities 60 extend into each of the secondary clearances 50 and 52 whereby to expose portions of trailing edges 42 and 44 for locating said portions of said trailing edges in open communication with flutes 26. Were cavities 60 to be omitted, flutes 26 would not be in open communication with any portion of trailing edges 42 and/or 44, instead, the flutes would be in open communication with the inner and outer leading edges of the primary clearances and with the trailing edges of the secondary clearances.

To further indicate the dimensional aspects of the primary clearances 30 and 32, it may be noted that for twist drills of a size from ¼ to ½ inch in diameter, the maximum width of the primary clearances approximates $\frac{1}{16}$ of an inch. Stated differently, the combined width of the primary clearances 30 and 32 for drills varying in size from ¼ to ½ inch will approximate $\frac{1}{10}$ of the diameter of the drill; whereas in the drill of Figs. 2, 5, 8 and 11, or the drills of Figs. 3, 6, 9 and 12, the widths of the lips at their widest points will be equal to or exceed ½ the diameter of the drill.

It has been conclusively established that the subject drill of Figs. 1, 4, 7 and 10 may be started at or from a "punch mark" without requiring any preliminary drilling, and this is true whether the subject drills are of a small diameter or of diameters in the order of 2½ to 3 inches. Because of the nature of sharp point 48, Fig. 7, and the relationship between the primary clearances 30—32 and the secondary clearances 50—52, the drill will take hold of metal at the punch mark incident to the application of a downward thrust on a rotating drill. Tests have conclusively established that the subject twist drill requires thrust pressure as much as 125 pounds less on a one-fourth inch drill than that required of the drills of Figs. 2 and 3.

Since the cutting edges of the subject drill are provided with both primary and secondary clearances, those portions of the cutting tip between leading cutting edges 34 and 36 and their respective trailing edges 42 and 44 will not rub or drag on the bottom of the surface being drilled; and since the secondary clearance areas 50 and 52 have a substantially wide angle, those surfaces will not rub on the bottom of the hole and develop heat by friction, as in the prior art drills.

The relationship of cavities 60 with reference to those portions of the drilling edges immediately behind the inner leading edges of the primary clearances enable coolant to readily flow down through flutes 26 into cavities 60 to be discharged directly against the cutting edges of the lips and thereby effectively dissipate the heat as it forms while efficiently serving as a carrier for the chips.

Drills embodying the teachings of those illustrated in Figs. 1, 4, 7 and 10 are capable of drilling holes in steel wherein the overall length of such holes is in excess of 30 times the hole depths or lengths that can be drilled by the prior art drills of Figs. 2 and 3 in similar substances, between sharpenings.

A drill embodying the teachings of the present invention, having a shank diameter of $\frac{11}{32}$ inch, was tested against a $\frac{11}{32}$ inch drill having the characteristics illustrated in Figs. 2, 5, 8 and 11 on mild steel. The drill of Figs. 2, 5, 8 and 11 became so dull after drilling through 16 feet of mild steel that it required sharpening before it could be used further. However, a drill of the same diameter embodying the teachings illustrated in Figs. 1, 4, 7 and 10 drilled through 139 feet of the same mild steel and was still sharp enough for further satisfactory use.

In other words, the subject drill produced a hole 800% longer on one sharpening than a drill of the type illustrated in Figs. 2, 5, 8 and 11.

In comparison with the conventional drill of Figs. 3, 6, 9 and 12, the drill embodying the present invention drilled holes 33 times longer than holes drilled by the conventional drill. In other words, the subject drill permitted a hole length 3300% longer than the hole length obtainable by using a conventional drill on one sharpening.

The reasons for the superiority of the drill embodying this invention over the Cleveland twist drill and the conventional drills will be apparent by a comparison of the construction of the points of those drills with the drill embodying the invention.

As shown in Figs. 2, 5 and 8 and 11 the Cleveland twist drill is provided with flutes 26, cutting edges 80 and 82, primary clearance surfaces 84 and 86, respectively, that trail the cutting edges 80 and 82, and secondary clearance areas 88 and 90 that trail the primary clearance areas 84 and 86, respectively. The secondary clearance surfaces or areas terminate in notches 92 and 94 which form a substantially straight, sharp edge 96 passing through the center of the tip. This edge is quite fragile and breaks down when drilling and particularly where the force or feed thrust applied to the point of the drill is heavy. The angle of the primary clearance areas is about 9 degrees, see Fig. 8, and since that area is quite extensive, it is difficult to get lubrication over the primary clearance surfaces, with the result that excessive amounts of heat are generated. Also the secondary clearance areas which are relatively extensive carry the heat from the cutting edges but since that heat is not efficiently carried away by lubricant or coolant the drill runs very hot as do the cuttings or chips. Furthermore, the coolant does not act efficiently in the removal of cutting chips up the flutes.

The length of the cutting edge 96 is approximately a quarter inch on a ⅞ inch drill. That means that it is difficult to center and start a drill such as shown in Figs. 2, 5, 8 and 11, in a punch mark. This is particularly so when the diameter of the drill is larger than a half inch. When the drill diameter is of the order of one or one and a half to two and a half inches, the driller or operator must start the hole by means of small drills of progressively larger diameter so that the Cleveland twist drill can center itself in the hole and drill the hole where it is intended to be.

The conventional drill shown in Figs. 3, 6, 9 and 12 is even more objectionable in the matter of starting it at a punch mark than the Cleveland twist drill. It is also more objectionable from the standpoint of the generation of heat and the frequency with which the edges must be re-sharpened. The Cleveland twist and conventional drills are also far more difficult to grind and re-sharpen than is the drill embodying the invention. The very fine edge 96 of the Cleveland twist drill requires a grinder of unusual skill to properly grind it. The conventional drill may be sharpened by offhand grinding on a machine, however expert skill is required. In contrast, the edges of the drill embodying this invention may be ground offhand on a wheel or placed in a fixture for grinding but in any event expert skill is not required.

The conventional drill has lips 100 and 102 of substantial area. Each lip includes cutting edges 106 and 108, respectively, which are interconnected by a substantially straight sharp edge 104. Therefore it is difficult to get lubricant or coolant between the surfaces of those lips and the bottom of the hole being drilled.

The drill embodying this invention also has decided advantages over the Cleveland twist drill and the conventional drills in that it will start the hole with less pressure on the point. The lips 30—32 being relatively narrow, have very little rubbing contact at the primary clearance areas, if any; the chips fall away from those areas quickly and lubricant or coolant can get to the cutting edges efficiently and in adequate volume. The efficiency of the coolant is accentuated by the cavities 60 which allow the coolant to flow back to the center of the tip of the drill. Therefore, the drill embodying this invention will drill a truer and a smoother hole and, often as not, the hole may not require reaming. Furthermore, when the drill runs out through the hole, it will not leave rough burrs or edges that require considerable finishing.

The Cleveland twist drill and the conventional drills have a greater tendency to chatter, have a greater tendency to run eccentrically, the chips are much hotter and on a run out through a hole the exit end of the hole will have burrs and rough edges. When drilling with a drill embodying the teachings of the invention, as shown in Figs. 1, 4, 7 and 10, the operator may catch the chips in his hands and feel only a slight degree of heat, whereas the chips formed by the drills of the Cleveland twist and the conventional type will be too hot to be held in the hand.

The drill of this invention may be used for drilling hard and soft metals and is substantially equally efficient in either kind.

Having thus described the invention, it will be apparent to those of ordinary skill in the art of twist drills that the subject drill embodies structural details which distinguish it from the drills of the prior art. In this connection it will be noted that the overall width of the elongate lips or blades 30 and 32 is relatively narrow. For twist drills in the range of from one-quarter inch to three inches in diameter the overall width of both lips is in the order of $\frac{1}{10}$ of the diameter of the drill, or, stated differently, the average width of each of said lips is in the order of $\frac{1}{20}$ of the drill diameter. This feature, in conjunction with the relative relationship of the primary and secondary clearances and the provision of cavities 60 in open communication with flutes 26 enable quantities of lubricant to be brought directly to the cutting edges, thereby greatly increasing the productive life and quality of work produced by the drill.

It should be understood that various changes and modifications may be made in structural details of the illustrated embodiment, within the scope of the appended claims, without departing from the spirit of the invention.

What is claimed as new and desired to be secured by Letters Patent is:

1. A one piece general-purpose metal-cutting twist drill having spiral cutting blades separated by spiral flutes, and a cutting tip defined by a pair of diametrically opposed cutting blades each provided with both primary and secondary clearances, wherein the areas of the primary clearances are less than one-half the areas of the secondary clearances.

2. A one piece general-purpose metal-cutting twist drill as in claim 1, in which the primary clearance angle is from about 2½° to 8° with reference to the drill axis normal and the secondary clearance angle is from 20° to 45°.

3. A one piece general-purpose metal-cutting twist drill having spiral cutting blades separated by spiral flutes, a cutting tip defined by a pair of diametrically opposed cutting blades each provided with a narrow, elongate, primary clearance defined by leading and trailing edges and a wider secondary clearance extending from the trailing edge of the primary clearance, each secondary clearance having a cavity in the apex thereof for exposing and placing a portion of the trailing edge of its respective primary clearance in open communication with a spiral flute.

4. A one piece general-purpose metal-cutting twist drill having spiral cutting blades separated by spiral flutes, a cutting tip defined by a pair of opposed cutting blades each provided with a primary clearance defined by a leading and a trailing edge and a secondary clearance extending downwardly from the trailing edge of a primary clearance to a spiral flute, wherein the leading edge of one cutting blade is in substantial axial alignment with the trailing edge of the primary clearance of the other cutting blade.

5. A one piece general-purpose metal-cutting twist drill having spiral cutting blades separated by spiral flutes, a cutting tip defined by a pair of opposed cutting blades inclined at substantially 31° from a plane normal to the axis of the drill and each provided with a primary clearance defined by a leading and trailing edge and a secondary clearance extending downwardly and outwardly from the trailing edge of a primary clearance to a spiral flute, the leading and trailing edges of said opposed cutting blades arranged so that each leading edge is in substantial axial alignment with the trailing edge of the primary clearance of the other cutting blade, and a cavity provided in the flute-adjacent face of each of the secondary clearances for exposing and placing portions of the trailing edge of each of the primary clearances in open communication with said flute.

6. A one piece general-purpose metal-cutting twist drill as in claim 5, in which the angle of inclination of the primary clearance is from 2½° to 8° with reference to the drill axis normal and wherein the angle of inclination of the secondary clearance is from 20° to 45°.

7. A one piece general-purpose metal-cutting twist drill as in claim 4, in which the average overall width of each primary clearance is substantially $\frac{1}{20}$ of the diameter of the drill.

8. A twist drill having at its tip substantially diametrically opposed blades constituting primary clearances having an included angle between them of about 118 degrees, said blades having leading cutting edges slightly diverging at the center of the drill and secondary primary clearances between the inner ends of the primary clearances, the blades having substantially parallel trailing edges extending to the center of the tip and forming with said leading edges an apex, said tip having secondary clearances rearwardly of and contiguous to the trailing edges of the blades, and a twisted body having spiral chisel cutting edges terminating respectively at the outer ends of the primary clearances and flutes adjacent and contiguous to the leading edges of said chisel cutting edges, characterized by the fact that the width of the primary clearance area of each blade is substantially equal to the width of its associated spiral cutting edge, that the clearance angle of each primary clearance is about 2½ degrees to about 8 degrees, the angle of each secondary clearance area is about 20 to 45 degrees, and that the flutes terminate in cavities at the junction of the secondary leading cutting edges of the blades and the inner ends of the trailing edges thereof.

References Cited in the file of this patent

UNITED STATES PATENTS

| 984,323 | Vauclain | Feb. 14, 1911 |
| 1,069,930 | Down | Aug. 12, 1913 |
| 1,887,374 | Emmons | Nov. 8, 1932 |

FOREIGN PATENTS

| 829,568 | Germany | Jan. 28, 1952 |